US011568000B2

(12) United States Patent
Le et al.

(10) Patent No.: US 11,568,000 B2
(45) Date of Patent: Jan. 31, 2023

(54) SYSTEM AND METHOD FOR AUTOMATIC TASK-ORIENTED DIALOG SYSTEM (71) Applicant: salesforce.com, inc., San Francisco, CA (US)

(72) Inventors: Hung Le, Singapore (SG); Chu Hong Hoi, Singapore (SG)

(73) Assignee: SALESFORCE.COM, INC., San Francisco, CA (US)

(*) Notice: Subject to any disclaimer, the term of this patent is extended or adjusted under 35 U.S.C. 154(b) by 282 days.

(21) Appl. No.: 16/736,268

(22) Filed: Jan. 7, 2020

(65) Prior Publication Data

US 2021/0089588 A1 Mar. 25, 2021

Related U.S. Application Data (60) Provisional application No. 62/922,224, filed on Sep. 24, 2019.

(51) Int. Cl.
*G06F 16/9032* (2019.01)
*G06F 40/56* (2020.01)
*G06N 5/04* (2006.01)
*G06N 3/04* (2006.01)

(52) U.S. Cl.
CPC ........ *G06F 16/90332* (2019.01); *G06F 40/56* (2020.01); *G06N 3/04* (2013.01); *G06N 5/04* (2013.01)

(58) Field of Classification Search
CPC ............. G06F 16/90332; G06F 40/56
See application file for complete search history.

(56) References Cited

U.S. PATENT DOCUMENTS

| 8,489,929 | B2 | 7/2013 | Lam et al. |
| 8,762,787 | B2 | 6/2014 | Lam et al. |
| 10,282,663 | B2 | 5/2019 | Socher et al. |
| 10,346,721 | B2 | 7/2019 | Albright et al. |
| 10,474,709 | B2 | 11/2019 | Paulus |
| 10,521,465 | B2 | 12/2019 | Paulus |
| 10,984,034 | B1 * | 4/2021 | Sandland ............... G10L 15/183 |
| 2016/0350653 | A1 | 12/2016 | Socher et al. |
| 2017/0024645 | A1 | 1/2017 | Socher et al. |
| 2017/0032280 | A1 | 2/2017 | Socher |

(Continued)

OTHER PUBLICATIONS

Wang, Y. Y., Deng, L., & Acero, A. (2005). Spoken language understanding. IEEE Signal Processing Magazine, 22(5), 16-31.*

(Continued)

*Primary Examiner* — Bryan S Blankenagel
(74) *Attorney, Agent, or Firm* — Haynes and Boone, LLP (57) ABSTRACT A method for dialog state tracking includes decoding, by a fertility decoder, encoded dialog information associated with a dialog to generate fertilities for generating dialog states of the dialog. Each dialog state includes one or more domains. Each domain includes one or more slots. Each slot includes one or more slot tokens. The method further includes generating an input sequence to a state decoder based on the fertilities. A total number of each slot token in the input sequence is based on a corresponding fertility. The method further includes encoding, by a state encoder, the input sequence to the state decoder, and decoding, by the state decoder, the encoded input sequence to generate a complete sequence of the dialog states.

20 Claims, 7 Drawing Sheets

(56) References Cited

U.S. PATENT DOCUMENTS

| | | |
|---|---|---|
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0362020 A1 | 11/2019 | Paulus et al. |
| 2020/0005765 A1 | 1/2020 | Zhou et al. |
| 2021/0217408 A1* | 7/2021 | Hakkani-Tur ........... G06N 3/02 |
| 2022/0020357 A1* | 1/2022 | Rastrow ................ G06F 40/216 |

OTHER PUBLICATIONS

Ba et al., "Layer Normalization," arXiv preprint arXiv:1607.06450, pp. 1-14, 2016.

Budzianowski et al., "MultiWOZ—A Large-scale Multi-domain Wizard-of-Oz Dataset for Task-oriented Dialogue Modelling," In Proceedings of the 2018 Conference on Empirical Methods in Natural Language Processing. pp. 5016-5026, Brussels, Belgium. Oct.-Nov. 2018. Association for Computational Linguistics. doi: 10.18653/v1/D18-1547. URL https://www.aclweb.org/anthology/D18-1547.

Dehghani et al., "Universal Transformers," arXiv preprint arXiv:1807. 03819, pp. 1-19, 2018.

Eric et al., "MultiWOZ 2.1: Multi-domain Dialogue State Corrections and State Tracking Baselines," arXiv preprint arXiv:1907. 01669, pp. 1-7, 2019.

Gao et al., "Dialog State Tracking: A Neural Reading Comprehension Approach," arXiv preprint arXiv:1908.01946, pp. 1-10, 2019.

Ghazvininejad et al., Constant-time Machine Translation with Conditional Masked Language Models. arXiv preprint arXiv:1904. 09324, pp. 1-9, 2019.

Glorot et al., "Understanding the Difficulty of Training Deep Feedforward Neural Networks," In Proceedings of the Thirteenth International Conference on Artificial Intelligence and Statistics, pp. 249-256, 2010.

Goel et al., "Hyst: A Hybrid Approach for Flexible and Accurate Dialogue State Tracking," arXiv preprint arXiv:1907.00883, pp. 1-5, 2019.

Graves et al., "Connectionist Temporal Classification: Labelling Unsegmented Sequence Data with Recurrent Neural Networks," In Proceedings of the 23rd International Conference on Machine Learning, pp. 369-376, ACM, 2006.

Gu et al., "Non-autoregressive Neural Machine Translation," arXiv preprint arXiv:1711.02281, pp. 1-13, 2017.

Henderson et al., "The Second Dialog State Tracking Challenge," In Proceedings of the 15th Annual Meeting of the Special Interest Group on Discourse and Dialogue (SJGDIAL), pp. 263-272, 2014a.

Henderson et al., "Word-based Dialog State Tracking with Recurrent Neural Networks," In Proceedings of the 15th Annual Meeting of the Special Interest Group on Discourse and Dialogue (SIGDIAL), pp. 292-299, 2014b.

Henderson et al., "Robust Dialog State Tracking using Delexicalised Recurrent Neural Networks and Unsupervised Adaptation," 2014 IEEE Spoken Language Technology Workshop (SLT), pp. 360-365, 2014c.

Kaiser et al., "Fast Decoding in Sequence Models using Discrete Latent Variables," arXiv preprint arXiv:1803.03382, pp. 1-10, 2018.

Kingma et al., "Adam: A Method for Stochastic Optimization," In International Conference on Learning Representations, (ICLR), pp. 1-15, 2015.

Kurata et al., "Leveraging Sentence-level Information with Encoder LSTM for Semantic Slot Filling," In Proceedings of the 2016 Conference on Empirical Methods in Natural Language Processing, pp. 2077-2083, Austin, Texas, Nov. 2016, Association for Computational Linguistics. doi:10.18653/v1/D16-1223, URL https://www.aclweb.org/anthology/D16-1223.

Lee et al., "SUMBT: Slot-utterance Matching for Universal and Scalable Belief Tracking," arXiv preprint arXiv:190707421, pp. 1-6, 2019.

Lee et al., Deterministic Non-autoregressive Neural Sequence Modeling by Iterative Refinement. arXiv preprint arXiv:1802.06901, pp. 1-11, 2018.

Lei et al., "Sequicity: Simplifying Task-oriented Dialogue Systems with Single Sequence-to-Sequence Architectures," In Proceedings of the 56th Annual Meeting of the Association for Computational Linguistics (vol. 1: Long Papers), pp. 1437-1447, 2018.

Libovicky et al., "End-to-End Non-autoregressive Neural Machine Translation with Connectionist Temporal Classification," arXiv preprint arXiv:1811.04719, pp. 1-6, 2018.

Mrksic et al., "Neural Belief Tracker: Data-driven Dialogue State Tracking," In Proceedings of the 55th Annual Meeting of the Association for Computational Linguistics (vol. 1: Long Papers), pp. 1777-1788. Association for Computational Linguistics, 2017. doi: 10.18653/vI/PI7-1163. URL http://www.aclweb.org/anthology/P17-1163.

Nouri et al., "Toward Scalable Neural Dialogue State Tracking Model," arXiv preprint arXiv:1812.00899, pp. 1-6, 2018.

Paszke et al., "Automatic Differentiation in Pytorch," 31st Conference on Neural Information Processing Systems (NIPS 2017), Long Beach, CA, USA, pp. 1-4.

Ramadan et al., "Large-scale Multi-Domain Belief Tracking with Knowledge Sharing," In Proceedings of the 56th Annual Meeting of the Association for Computational Linguistics, vol. 2, pp. 432-437, 2018.

Rastogi et al., "Scalable Multi-Domain Dialogue State Tracking," IEEE Automatic Speech Recognition and Understanding Workshop (ASRU), pp. 561-568, 2017.

Schwenk et al., "Continuous Space Translation Models for Phrase-based Statistical Machine Translation," In Proceedings of COLING 2012: Posters, pp. 1071-1080, Mumbai, India, Dec. 2012. The COLING 2012 Drganizing Committee, URL https://www.aclweb.org/anthology/C12-2104.pdf.

See et al., "Get to the point: Summarization with pointer-generator networks," In Association for Computational Linguistics. URL https://arxiv.org/abs/1704.04368, pp. 1-19, 2017.

Serban et al., "Building End-to-End Dialogue Systems using Generative Hierarchical Neural Network Models," In Thirtieth AAAI Conference on Artificial Intelligence, pp. 3776-3783, 2016.

Shi et al., "Recurrent Support Vector Machines for slot Tagging in Spoken Language Understanding," In Proceedings of the 2016 Conference of the North American Chapter of the Association for Computational Linguistics: Human Language Technologies, pp. 393-399, San Diego, California, Jun. 2016, Association for Com- (56) References Cited

OTHER PUBLICATIONS putational Linguistics, doi: 10.18653/v1/N16-1044, URL https://www.aclweb.org/anthology/N16-1044.

Srivastava et al., "Dropout: A Simple Way to Prevent Neural Networks from Overfitting," The Journal of Machine Learning Research, 15(1):1929-1958, 2014.

Szegedy et al., "Rethinking the Inception Architecture for Computer Vision," In Proceedings of the IEEE Conference on Computer Vision and Pattern Recognition, pp. 2818-2826, 2016.

Vaswani et al., "Attention is All you Need," In I. Guyon, U. V. Luxburg, S. Bengio, H. Wallach, R. Fergus, S. Vishwanathan, and R. Garnett (eds.), Advances in Neural Information Processing Systems 30, pp. 5998-6008, Curran Associates, Inc. 2017a. URL http://papers.nips.cc/paper/7181-attention-is-all-you-need.pdf.

Vinyals et al., "Pointer Networks," In C. Cortes, N.D. Lawrence, D.D. Lee, M. Sugiyama, and R. Garnett (eds.), Advances in Neural Information Processing Systems 28, pp. 2692-2700, Curran Associates. Inc, 2015, URL http://papers.nips.cc/paper/5866-pointer-networks.pdf.

Wang et al., "Non-autoregressive Machine Translation with Auxiliary Regularization" arXiv preprint arXiv:1902.10245, pp. 1-8, 2019.

Wen et al., "A Network-based End-to-End Trainable Task-oriented Dialogue System," In Proceedings of the 15th Conference of the European Chapter of the Association for Computational Linguistics: vol. 1, Long Papers, pp. 438-449, Valencia. Spain, Apr. 2017, Association for Computational Linguistics, URL https://www.aclweb.org/anthology/E17-1042.

Wu et al., "Transferable Multi-domain State Generator for Task-oriented Dialogue Systems," In Proceedings of the 57th Annual Meeting of the Association for Computational Linguistics, pp. 808-819, Florence, Italy. Jul. 2019, Association for Computational Linguistics, URL https://www.aclweb.org/anthology/P19-1078.

Xu et al., "An End-to-End Approach for Handling Unknown Slot values in Dialogue State Tracking," In Proceedings of the 56th Annual Meeting of the Association for Computational Linguistics (vol. 1: Long Papers), pp. 1448-1457, Association for Computational Linguistics, 2018, URL http://aclweb.org/anthology/P18-1134.

Zhong et al., "Global-locally Self-attentive Encoder for Dialogue State Tracking," In Proceedings of the 56th Annual Meeting of the Association for Computational Linguistics (vol. 1: Long Papers), pp. 1458-1467, Melbourne, Australia, Jul. 2018, Association for Computational Linguistics, doi: 10.18653/v1/P18-1135, URL https://www.aclweb.org/anthology/P18-1135.pdf.

\* cited by examiner

SYSTEM AND METHOD FOR AUTOMATIC TASK-ORIENTED DIALOG SYSTEM

RELATED APPLICATIONS

This application claims priority to U.S. Provisional Patent Application No. 62/922,224 filed Sep. 24, 2019, which is incorporated by reference herein in its entirety.

TECHNICAL FIELD

The present disclosure relates generally to neural networks and more specifically to task-oriented dialog systems using neural networks to automatically perform tasks identified in natural language dialogs with a user.

BACKGROUND

In task-oriented dialog systems using neural networks, a dialog agent is usually used to assist humans for one or many tasks, including for example, finding a restaurant and hooking a hotel. However, typical approaches of dialog state tracking (DST) in task-oriented dialog systems incur high time cost when the dialog context evolves over multiple dialog domains.

Accordingly, it would be advantageous to develop systems and methods for improved dialog state tracking in task-oriented dialog systems.

In the figures, elements having the same designations have the same or similar functions.

DETAILED DESCRIPTION

Figure 1:
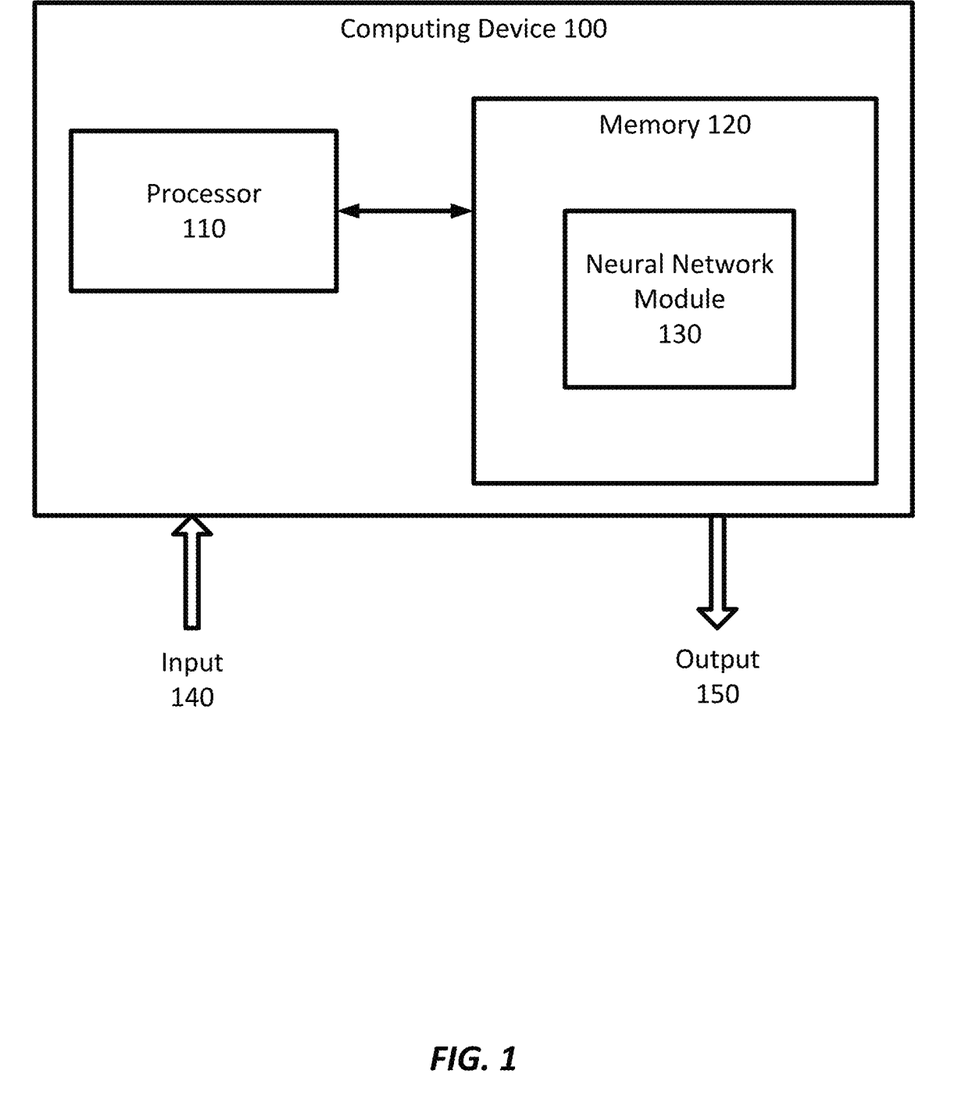
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a hoard added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

As discussed above, dialog state tracking (DST) is an important component in task-oriented automatic dialog systems, especially for dialogs with complex domains that require fine-grained tracking of relevant slots. DST aims to identifies user goals expressed during conversation in the form of dialog states, which is used by the dialog system to reach the dialog goal that fulfills the user requirements. DST may use a slot-filling architecture to translate user utterances into a semantic representation with predefined semantic slots (e.g., attraction_area, attraction_type, restaurant_food, restaurant_pricerange, etc.) of corresponding dialog domains (e.g., attraction, restaurant, etc.). A dialog state may include a set of (slot, value) pairs, e.g. (attraction_area, center), and (attraction_type, theater.). DST is used to estimate slots and corresponding values from a user utterance. DST may use a fixed vocabulary model or an open vocabulary model. A fixed vocabulary model assumes known ontology and generates a score for each candidate of (slot, value) pair. An open vocabulary model may generate the candidates of (slot, value) pairs (e.g., entity names, time slots, etc.) from the dialog context.

An example task-oriented dialog between the automatic dialog system and a user with annotated dialog states after each user turn is illustrated below:

| | |
|---|---|
| Human: | i want to visit a theater in the center of town. |
| Dialog State: | (attraction-area, centre), (attraction-type, theatre) |
| System: | there are 4 matches. i do not have any info on the fees. do you have any other preferences? |
| Human: | no other preferences. i just want to be sure to get the phone number of whichever theatre we pick. |
| Dialog State: | (attraction-area, centre), (attraction-type, theatre) |
| System: | i recommend the cambridge corn exchange there phone number is 012233357851. is there anything else i can help you with? |
| Human: | yes, i am looking for a tuesday train. |
| Dialog State: | (attraction-area, centre), (attraction-name, the cambridge corn exchange), (attraction-type, theatre), (train-day, tuesday) |
| System: | where will you be departing from and what's your destination? |
| Human: | from cambridge to london liverpool street. |
| Dialog State: | (attraction-area, centre), (attraction-name, the cambridge corn exchange), (attraction-type, theatre), (train-day, tuesday), (train-departure, cambridge), (train-destination, london liverpool street) |

In the example dialog, the dialog states denote slots and corresponding slot values from the "attraction" domain and "train" domain after each turn of the dialog. For example, the slot/values from the "attraction" domain include (attraction-area, centre), (attraction-type, theatre), and (attraction-name, the Cambridge corn exchange). For further example, the slot/values from the "train" domain include (train-day, Tuesday), (train-departure, Cambridge), and (train-destination, London Liverpool street). The value of a domain (e.g., "restaurant," "train") may be referred to as a domain token, the value of a slot (e.g., "name," "departure") may be referred to as a slot token, and the value of a domain-slot pair (e.g., "restaurant-name," "train-departure") may be referred to as a domain-slot token.

In some embodiments, an open vocabulary DST model relies on autoregressive encoders and decoders. In those embodiments, encoders encode the dialog context sequentially and generate token $t_i$ of individual slot value one by one conditioned on previously generated tokens $t_{[1:i-1]}$. For downstream tasks of DST that emphasizes on low latency (e.g. generating real-time dialog responses), such autoregressive approaches incur expensive time cost as the ongoing dialogs become more complex. The time cost is caused by two major components: length of source sequences such as dialog history and user utterances, and length of slot values. For complex dialogs with long dialog context extended over multiple dialog domains (e.g., attraction, train, restaurant, etc.), the time cost will increase significantly in both encoding and decoding.

To address those performance issues and improve the performance (e.g., accuracy, response time, etc.) of DST and the task-oriented dialog system, systems and methods for improved DST in a task-oriented dialog system are described. For example, the performance of DST is improved by using a non-autoregressive decoding framework, which improves the latency for real-time dialogs. For further example, the performance of DST is improved by explicitly learning inter-dependencies across slots for decoding dialog states as a complete set rather than individual slots. The improved DST allows capturing dependencies at token level across slots in addition to the slot/domain level, and detects potential signals/relationships across slots and dialog domains to generate more correct "sets" of slots. By using the improved DST, the state-of-the-art performance is achieved on the multi-domain task-oriented dialog dataset while significantly reducing the inference latency (e.g., by an order of magnitude).

In some embodiments, the DST uses a non-autoregressive decoding framework. Dialog states are generated as a structure sequence with sub-sequences defined as concatenation of slot values. Using this structured form of dialog states, the sequences of latent variables may be inferred easily from the dialog state labels (which is different from neural machine translation models (NMT) where these supporting signals are not directly available). Furthermore, the lower semantic complexity of slot values in DST as compared to long sentences in NMT makes adopting non-autoregressive in DST easier.

By applying a non-autoregressive framework for generation-based (e.g., open vocabulary) DST, joint state tracking across are allowed, which results in better performance and an order of magnitude lower latency during inference. The non-autoregressive DST may use fertility to keep track the number of times that each input token is copied. The fertility is used to form a sequence as the input to the decoder for non-autoregressive decoding. Fertility is used for DST setting from the observation of the inherent structured representation of dialog states, where each state is considered as a sequence of concatenated slot values. The structure of the sequence may be defined by the boundaries of individual slot values. For training, the boundaries may be obtained from dialog state itself by simply measuring number of tokens of individual slots. The non-autoregressive DST of the task-oriented dialog system may use a two-stage decoding process: (1) the first decoder (also referred to as a fertility decoder) learns relevant signals from the input dialog context and generates a fertility for each input slot representation; and (2) the predicted fertility from the fertility decoder is used to form a structured sequence which consists of multiple sub-sequences, each represented as (slot token multiplied by slot fertility). In other words, the number of a slot token in the input sequence is based on its corresponding predicted fertility. The result sequence is used as input to the second decoder (also referred to as a state decoder) to generate all the tokens of the target dialog state at once, instead of generating the tokens sequentially.

In some embodiments, different from some models that assume independence among slots in dialog states without explicitly considering potential dependencies across the slots, the DST of the task-oriented dialog system achieves improved performance by explicitly learning dependencies at both slot level (across slots) and token level (across tokens), which are used to decode dialog state as a complete set. In those embodiments, slots in dialog states are not assumed to be independent. The non-autoregressive DST detects the relationship between slots in dialog states. For example, location-related pairs such as taxi departure (slot "taxi_departure" in dialog domain "taxi") and taxi destination (slot "taxi_destination" in dialog domain "taxi") should not have the same value. For further example, time-related pairs such as (taxi_arriveBy, taxi_leaveAt) and cross-domain pairs such as (hotel_area, attraction_area) should not have the same value. By considering all possible signals across domains and slots to generate each DST as a set, DST evaluation metric of joint accuracy, which measure accuracy at state (set of slots with their corresponding values) level rather than separate slot level, is directly optimized.

Figure 2:
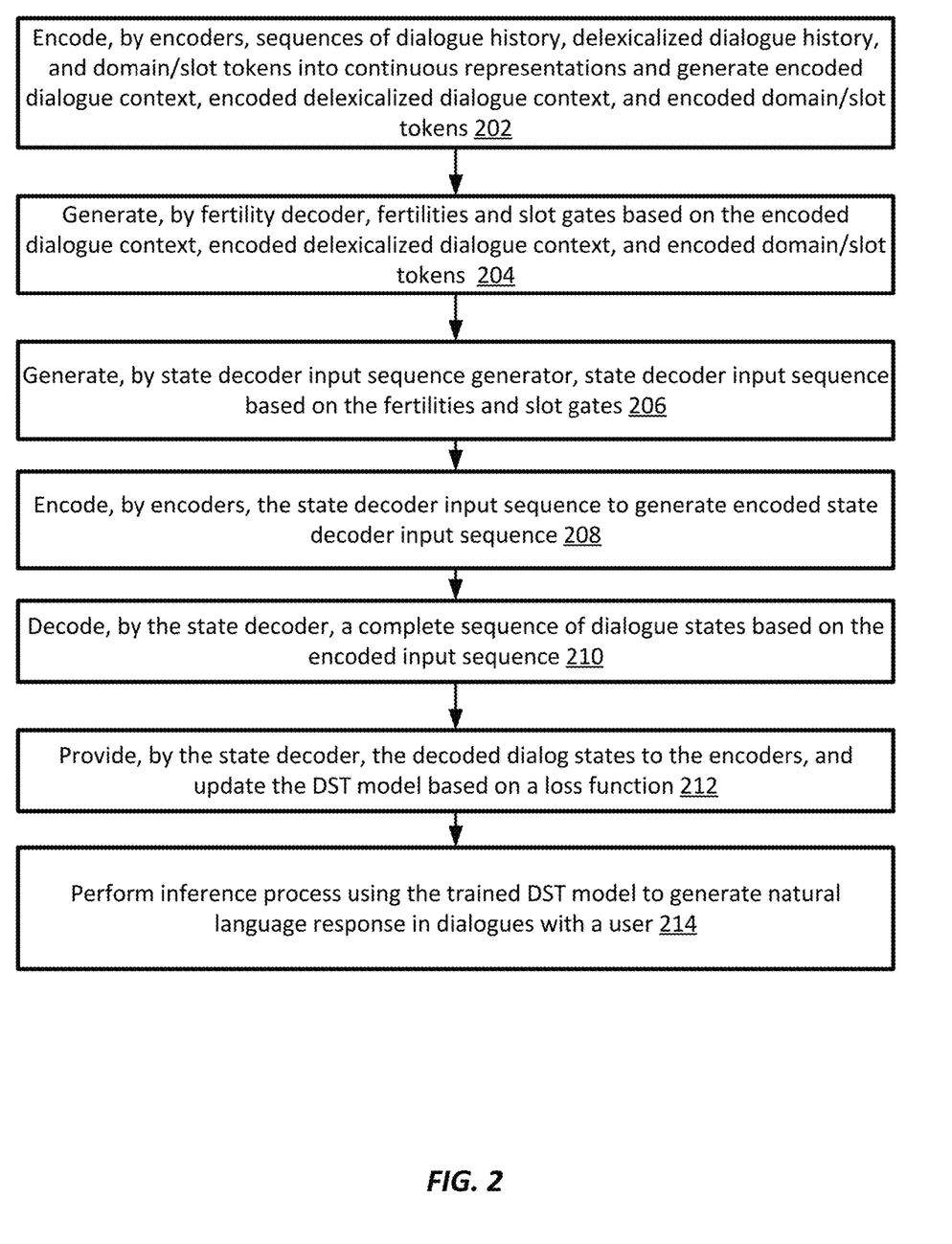
FIG. 2 is a simplified diagram of a method of training a task-oriented dialog system according to some embodiments.

FIG. 2 is a simplified diagram of a method 200 for training a non-autoregressive DST of a task-oriented dialog system and performing a task using the trained task-oriented dialog system according to some embodiments. One or more of the processes 202-214 of method 200 may be implemented, at least in part, in the form of executable code stored on non-transitory, tangible, machine-readable media that when run by one or more processors may cause the one or more processors to perform one or more of the processes 202-214. In some embodiments, the method 200 may correspond to the method used by neural network module 130 to perform training and/or perform inference using the trained neural network model for various tasks including performing tasks identified in dialogs with a user and generating natural language dialogs responses.

The method 200 begins at block 202, where encoders of a non-autoregressive DST model encode sequences of dialog history, delexicalized dialog history, and domain-slot tokens into continuous representations and generate encoded dialog context, encoded delexicalized dialog context, and encoded domain-slot tokens. A domain-slot token includes names of a (domain, slot) pair (e.g. "restaurant-name" where the domain is "restaurant" and the slot is "name," "train-departure" where the domain is "train" and the slot is "departure").

At block 204, fertility decoder of the DST generates fertilities and slot gates based on the encoded dialog context, encoded delexicalized dialog context, and encoded domain-slot tokens.

At block 206, a state decoder input sequence generator generates the input sequence to the state decoder based on the fertilities and slot gates from the fertility decoder.

At block 208, encoders encode the state decoder input sequence to generate encoded state decoder input sequence.

At block 210, the state decoder decodes a complete sequence of dialog states based on the encoded input sequence.

At block 212, the state decoder provides the decoded dialog states to the encoders. Parameters of the encoders and decoders of the DST are updated based on a loss function based on the decoded dialog states. At block 214, an inference process is performed using the trained DST model to generate natural language response in dialogues with a user.

Figure 3:
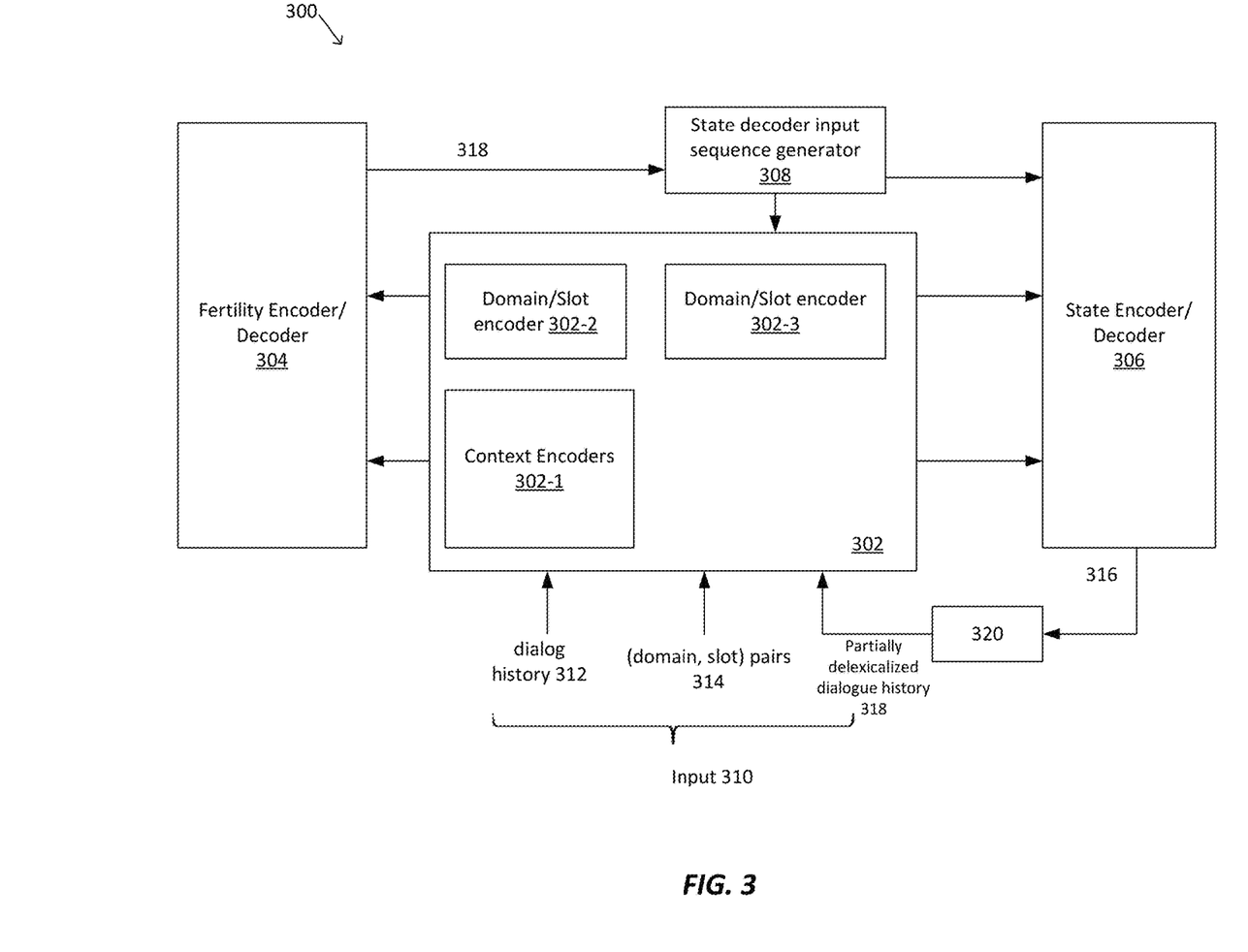
FIG. 3 is a simplified diagram of a task-oriented dialog system according to some embodiments.

Referring to FIG. 3, illustrated therein is an example non-autoregressive DST model 300 of a task-oriented dialog system. As shown in the example of FIG. 3, the non-autoregressive DST model 300 includes encoders 302, fertility decoder 304, and state decoder 306. The encoders 302 receives input 310 (e.g., dialog history 312, delexicalized dialog history (e.g., generated from dialog history 312), domain and slot pairs 314), and provides embedded results (e.g., with a lower dimension than the corresponding input) of the input 310 to the fertility decoder 304. The embedded results may include encoded dialog context Z, encoded delexicalized dialog context $Z_{del}$, and encoded (domain, slot) pairs $Z_{ds}$.

In some embodiments, the encoders 302 includes fertility encoder and state encoder that perform encoding for fertility decoder 304 and state decoder 306 respectively. In some embodiments, the fertility decoder 304 includes its corresponding fertility encoder, and therefore is also referred to as fertility encoder/decoder 304. The state decoder 306 includes its corresponding state encoder, and therefore is also referred to as state encoder/decoder 306.

The input 310 of the non-autoregressive DST model 300 may include the dialog history 312 expressed as $X=(x_1, \ldots x_N)$, and a sequence of applicable (domain, slot) pairs 314 expressed as $X_{ds}=(d_1, s_1), \ldots, (d_G, s_H)$, where G and H are the total numbers of domains and slots respectively.

The output 316 of the non-autoregressive DST model 300 (e.g., from the state decoder 306) is the corresponding dialog states up to the current dialog history. In some embodiments, the output of dialog state is denoted as tuple (slot, value) or (domain, slot, value) for multi-domain dialogs. Alternatively, the output may be provided as concatenation of slot values of the dialog state as follows:

$$Y = (Y^{d_i,s_j}, \ldots, Y^{d_I,s_J}) = \left(y_1^{d_i,s_j}, y_2^{d_i,s_j}, \ldots, y_1^{d_I,s_J}, y_2^{d_I,s_J}, \ldots\right), \quad (1)$$

where I and J are the total number of domains and slots of the predicted dialog states respectively.

The encoders 302 (including context encoders 302-1, domain/slot encoders 302-2 and 302-3) perform token-level embedding and positional encoding to encode the input dialog history 312 and (domain, slot) pairs 314 into continuous representations.

The fertility decoder 304 may include stacked self-attention layers and feed-forward network to obtain relevant signals across dialog context to generate a fertility $Y_f^{d_g,s_h}$ for each (domain, slot) pair $(d_g, s_h)$. The fertility decoder 304 may generate output 318, which may include predicted fertility and/or predicted gate values.

In some embodiments, predicted fertility of the fertility output 318 may be provided as a sequence as follows:

$$Y_{fert} = Y_f^{d_1,s_1}, \ldots, Y_f^{d_G,s_H}, \text{ where } Y_f^{d_g,d_h} \in \{0, \max(SlotLength)\}. \quad (2)$$

In various examples, the max(SlotLength) may be set according to the training data.

In some embodiments, the fertility decoder 304 includes a slot gating unit (e.g., by performs a gating process) as an auxiliary prediction. For example, each gate g is restricted to a number of possible gate values (e.g., three possible gate values including "none," "don't care," and "generate"). The gates may be used to form higher-level classification signals to support fertility decoding. The predicted gates of the fertility output 318 may be provided as a sequence as follows:

$$Y_{gate} = Y_g^{d_1,s_1}, \ldots, Y_g^{d_G,s_H}. \quad (3)$$

In some embodiments, fertility decoder 304 provides the fertility output 318 (e.g., including predicted fertilities and gate values) to state decoder input sequence generator 308, which generates a state decoder input sequence based on the (domain, slot) pairs and fertilities and gate values. A state decoder input sequence may include sub-sequences of $(d_g, s_h)$ repeated by $Y_f^{d_g,s_h}$ times, and those subsequences are concatenated sequentially. In an example, the state decoder input sequence may be provided as follows:

$$X_{ds \times fert} = \left((d_1, s_1)^{Y_f^{d_1,s_1}}, \ldots, (d_G, s_H)^{Y_f^{d_G,s_H}}\right), \quad (4)$$

where $\|X_{ds \times fert}\| = \|Y\|$.

In some embodiments, the domain/slot encoder 302-3 performs encoding to the state decoder input sequence to generate encoded state decoder input sequence, and provide the encoded state decoder input sequence to the state decoder. Alternatively, the state decoder 306 includes a state decoder to perform the encoding for generating the encoded state decoder input sequence, and as such, the state decoder 306 may be referred to as state encoder/decoder 306.

The state decoder 306 may generate a complete sequence of dialog states based on the encoded input sequence, and provide the generated dialog states to the encoders 302. In some examples, the state decoder 306 projects the input sequence through attention layers with dialogue history. During this decoding process, a memory of hidden states of dialogue history may be maintained, and the output from the state decoder 306 is used as a query to attend on this memory and copy tokens from the dialogue history to generate dialogue state 316.

In some embodiments, the dialogue state 316 from the state decoder 306 is provided to a delexicalization unit 320, which delexicalizes dialog history (e.g., including dialogue state 316 and dialogue history 312), to generate a partially delexicalized dialogue history 318. The partially delexicalized dialogue history 318 is then provided to an input of the DST model 300. As such, the partially delexicalized dialogue history 318 incorporates information from previous dialogue turns to predict next turn state. The dialogue history is delexicalized till the last system utterance by removing real-value tokens that match the previously decoded slot values to tokens expressed as domain-slot. For example, given a token $x_n$ and the current dialogue turn t, the token is delexicalized as follows:

$$x_{n,del} = delex(x_n) = \begin{cases} domain_{idx} - slot_{idx}, & \text{if } x_n \subset \hat{Y}_{t-1}. \\ x_n, & \text{otherwise.} \end{cases} \quad (5)$$

$$domain_{idx} = X_{ds \times fert}[idx][0],$$

$$slot_{idx} = X_{ds \times fert}[idx][1],$$

$$idx = Index(x_n, \hat{Y}_{t-1}).$$

For example, the user utterance "I look for a cheap hotel" is delexicalized to "I look for a hotel_pricerange hotel," if the slot "hotel_pricerange" is predicted as "cheap" in the previous turn. The use of delexicalized form of dialogue history removes the need for an Natural Language Understanding (NLU) coupled to a DST model, because the predicted state from the DST model itself is used and delexicalized form of dialogue history does not rely on NLU module to process the user utterance to generate tagged user utterance as input to the DST model. In some embodiments, system actions in the previous turn, in addition to the belief state, are also used to delexicalize the dialog history in a similar manner.

Figure 4:
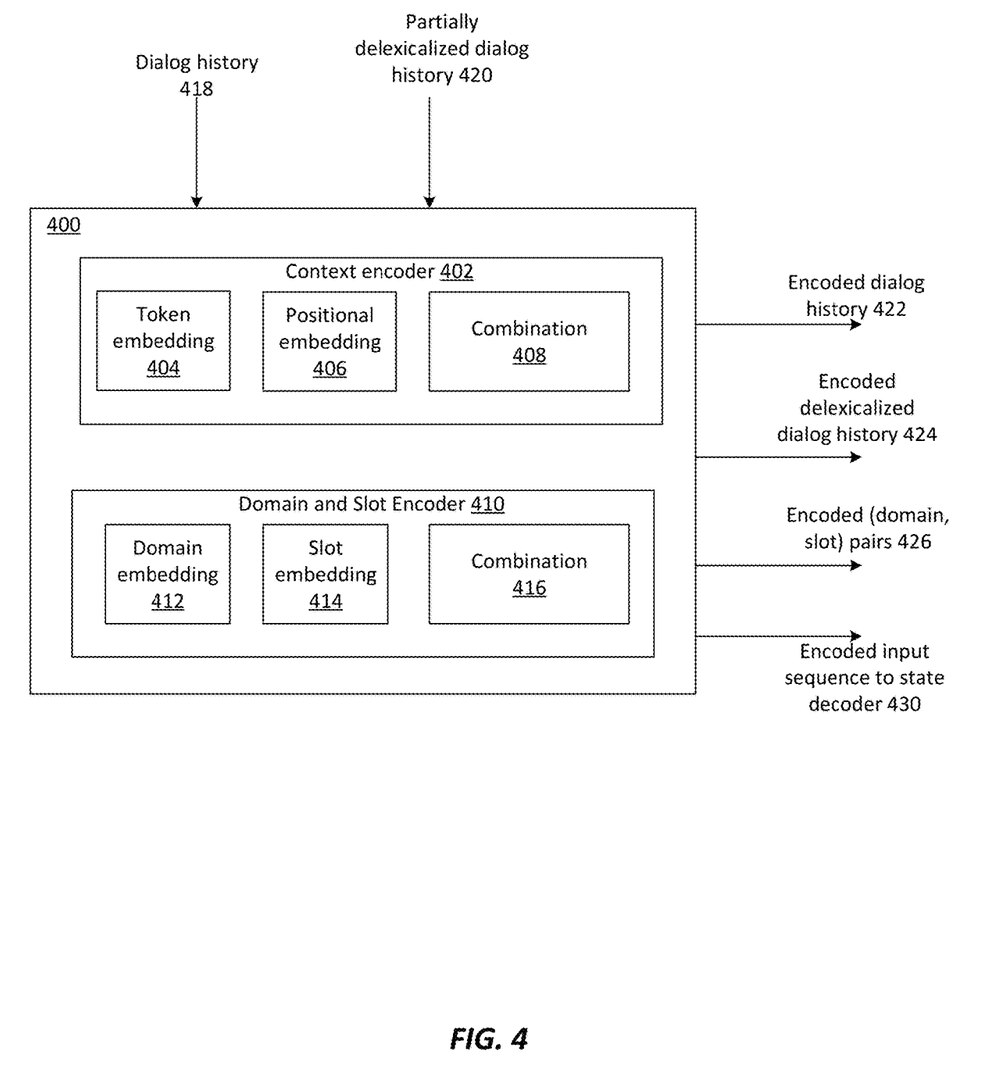
FIG. 4 is a simplified diagram of encoder systems of a task-oriented dialog system according to some embodiments.

Referring to FIG. 4, an example encoder system 400 (e.g., encoders 302 of FIG. 3, fertility encoder, state encoder) is illustrated. The encoder system 400 may encode sequences of dialog history, delexicalized dialog history, and domain and slot pairs into continuous representations. The encoder system 400 may include a context encoder 402 (e.g., for encoding dialog history and/or delexicalized dialog history) and a domain and slot encoder 410 (e.g., for encoding (domain, slot) pairs).

For example, the encoder system 400 may receive a dialog history input X 418, and embed (e.g., using context encoder 402) the dialog history X 418 into a sequence of continuous representations $Z_{emb}=(z1,\ldots,zn)$. An example of the dialog history input X 418 is provided in a dialog context, including e.g., "I want to find a restaurant with British food I look for architecture attraction near the center . . . " For further example, the encoder system 400 may also receive partially delexicalized dialog $X_{emb, del}$ 420, and encode (e.g., using context encoder 402) the partially delexicalized dialog $X_{emb, del}$ into a sequence of continuous representations $Z_{del}$. An example of the partially delexicalized dialog $X_{emb, del}$ 420 is provided in a delexicalized context, including e.g., "I want to find a restaurant with <rest_food> food . . . I look for <attr_type> attraction near the <attr_area> . . . " Specifically, <rest_food> corresponds to "British," <attr_type> corresponds to "architecture," and <attr_area> corresponds to "center."

In some embodiments, the encoded dialogue history Z is stored in a memory, which will be used in a pointer network to copy words for dialogue state generation. This may be used to overcome the out of vocabulary (OOV) challenges.

In some embodiments, each (domain, slot) pair may be encoded into continuous representation $z_{ds}$ as input to the decoders (e.g., fertility decoder and/or state decoder). Each vector $z_{ds}$ may be used to pass information along the decoding process to obtain a contextual vector for slot and fertility prediction during the decoding process.

In some embodiments, the encoder system 400 includes a context encoder 402 (e.g., context encoder 302-1 of FIG. 3). The context encoder 402 may include a token embedding unit 404, a positional embedding unit 406, and a combination unit 408. The token embedding unit 404 may include a token-level trainable embedding layer and a layer normalization unit, and perform token embedding. The positional embedding unit 406 may perform positional encoding, e.g., a sine and cosine positional encoding function. The combination unit 408 may perform an element-wise summation to combine the token-level embedding from the token embedding unit 404 with the positional embedding from the positional embedding unit 406, each of the token-level embedding and positional embedding having the same embedding dimension d.

In the context encoder 402, the embeddings weights may be shared to embed raw dialog history and partially delexicalized dialog history. The embedding weights may also be shared to encode input to various decoders, including e.g., the fertility decoder and state decoder. The context encoder 402 may generate encoded dialog history Z 422 and encoded delexicalized dialog history $Z_{del}$ 424. The final embedding Z and $Z_{del}$ of X and $X_{del}$ may be provided as follows:

$$Z = Z_{emb} + PE(X) \in \mathbb{R}^{N \times d}; \quad (6)$$

$$Z_{del} = Z_{emb,del} + PE(X_{del}) \in \mathbb{R}^{N \times d}, \quad (7)$$

where PE denotes positional encoding. In some embodiments, the positional encoding uses sine and cosine functions in a transformer model, where each position of the sequence and each embedding dimension is encoded by a fixed value.

In some embodiments, the encoder system 400 includes a domain and slot encoder 410 (e.g., domain/slot encoder 302-2 or 302-3 of FIG. 3). The domain and slot encoder 410 may include a domain embedding unit 412, a slot embedding unit 414, and a combination unit 416. The domain embedding unit 412 and slot embedding unit 414 perform embedding to the corresponding domain and slot of a (domain, slot) pair separately. Each of the domain g and slot h is embedded into a continuous representation $z_{d_g}$ and $z_{s_h}$ respectively, each with a dimension d. The combination unit 416 combines the two separate embedding vectors $z_{d_g}$ and $z_{s_h}$, and generates the final embedding of (domain, slot) pair (e.g., by element-wise summation of the component vectors) as follows:

$$z_{d_g, s_h} = z_{d_g} + z_{s_h} \in \mathbb{R}^d. \tag{8}$$

In some embodiments, the embedding weights of domains/slot tokens are shared for both fertility decoder and state decoder. In some examples, for input to state decoder, sequential information is injected into the input sequence of $X_{fert}$, which may allow the models factor in position-wise information of the input sequence to decoder target state sequence. The domain and slot encoder 410 may generate encoded (domain, slot) pairs $Z_{ds}$ 426 and $Z_{ds \times fert}$ 430. The encoded (domain, slot) pairs in $X_{ds}$ and $X_{ds \times fert}$ may be provided as follows:

$$Z_{ds} = Z_{emb, ds} = z_{d_1, s_1} \oplus \ldots \oplus z_{d_G, s_H}, \tag{9}$$

$$Z_{ds \times fert} = Z_{emb, ds \times fert} + PE(X_{ds \times fert}), \tag{10}$$

$$Z_{emb, ds \times fert} = (z_{d_1, s_1})^{Y_f^{d_1, s_1}} \oplus \ldots \oplus (z_{d_G, s_H})^{Y_f^{d_G, s_H}}, \tag{11}$$

where $\oplus$ denotes concatenation operation. In some embodiments, different from a typical decoder input in a transformer, the input sequences to both fertility decoder and state decoder are not shifted (e.g., by one or more positions), because both fertility decoder and state decoder perform non-autoregressive decoding. As such, all output tokens are generated in position i based on all remaining positions of the sequence. For example, for fertility decoding by a fertility decoder, all output tokens may be generated in position i based on remaining positions (e.g., 1, 2, ..., i−1, i+1, ..., $|X_{ds}|$) of the corresponding sequence. For further example, for state decoding by a state decoder, all output tokens may be generated in position i based on remaining positions (e.g., 1, 2, ..., i−1, i+1, ..., $\|X_{ds \times fert}\|$) of the corresponding sequence.

Figure 5:
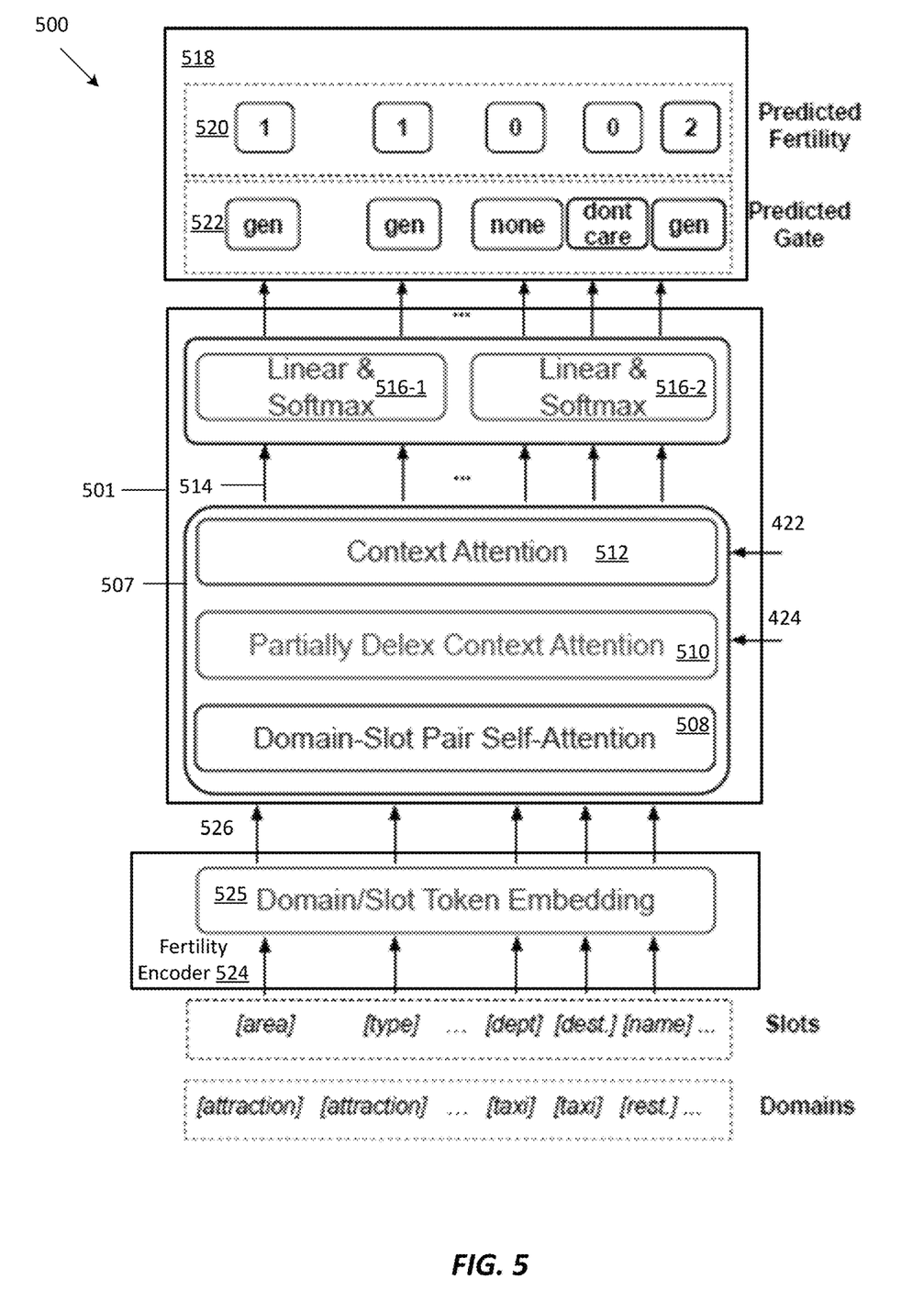
FIG. 5 is a simplified diagram of a fertility encoder/decoder model of a task-oriented dialog system according to some embodiments.

Referring to FIG. 5, an example fertility encoder/decoder system 500 (e.g., fertility encoder/decoder system 304 of FIG. 3) is illustrated. The fertility encoder/decoder system 500 receives encoded dialog history Z 422 and encoded delexicalized dialog history $Z_{del}$ 424 from an encoder system (e.g., encoder system 400 of FIG. 4).

In the example of FIG. 5, the fertility encoder/decoder system 500 includes a fertility encoder 524 and a fertility decoder 501. The fertility decoder 501 receives encoded (domain, slot) pairs $Z_{ds}$ 526 from the fertility encoder 524. The fertility encoder 524 includes a domain-slot token embedding unit 525 (e.g., substantially similar to the domain and slot encoder 410 of FIG. 4).

In some embodiments, the fertility encoder 524 performs only domain-slot token encoding and does not include a domain/slot positional encoding unit to perform domain/slot positional encoding. In those embodiments, domain/slot positional encoding is not needed, because pairs of domain and slot are independent in terms of position and the pairs can be shuffled without impact on the performance. As such, the fertility encoding does not need sequential attributes to be injected by positional encoding. On the other hand, in some embodiments, in the state encoder, permutation of input tokens may impact the performance, and as such, the state encoder includes positional encoding. For example, for a slot predicted to have a length of two tokens, the inputs to the state encoder are injected with sequential attribute to represent their corresponding positions (e.g., first position or second position).

In some embodiments, the fertility decoder 501 receives encoded (domain, slot) pairs $Z_{ds}$ 526 from the encoder system (e.g., encoded (domain, slot) pairs $Z_{ds}$ 426 of encoder system 400 of FIG. 4).

The fertility decoder 501 includes an attention unit 507 including multiple attention layers 508, 510, and 512 to learn potential dependencies across the (domain, slot) pairs in combination in relation with dialog context. Given the encoded dialog context Z 422, encoded delexicalized dialog context $Z_{del}$ 424, and encoded (domain, slot) pairs $Z_{ds}$ 526, the contextual signals are learned and passed into each $z_{ds}$ vector through attention layers 508, 510, and 512. A multi-head attention unit may be used to project the presentations into multiple subspaces. An example attention unit may be provided as scaled dot-product attention between query Q, key K, and value V as follows:

$$\text{Attention}(Q, K, V) = \text{softmax}\left(\frac{QK^T}{\sqrt{d_k}} V\right). \tag{12}$$

Each multi-head attention may be followed by a position-wise feedforward network. In some embodiments, the feedforward is applied to each position separately and identically. Two linear layers with a ReLU activation may be used in between. The attention unit 507 includes sequenced attention layers 508, 510, and 512. Each attention layer may be used to learn relevant signals and pass on the learned knowledge to each (domain, slot) pair representation $z_{ds}$. The attention layer sequence may be provided as follows: Domain-slot pair self-attention layer 508 may generate output $Z_{ds}$ based on received encoded domain/slot pairs $Z_{ds}$ 526 as follows:

$$Z_{ds} = \text{Attention}(Z_{ds}, Z_{ds}, Z_{ds}) \in \mathbb{R}^{N \times d}. \tag{13}$$

$Z_{ds}$ from the domain-slot pair self-attention layer 508 (e.g., computed according to equation (13)) may be provided to the next layer 510. The partially delexicalized context attention layer 510 may generate output $Z_{ds}$ based on the received $Z_{ds}$ from previous layer 508 and encoded delexicalized dialog history $Z_{del}$ 424 as follows:

$$Z_{ds} = \text{Attention}(Z_{ds}, Z_{del}, Z_{del}) \in \mathbb{R}^{N \times d}. \tag{14}$$

The context attention layer 512 may generate output $Z_{ds}$ based on the received $Z_{ds}$ (e.g., from the previous partially delexicalized context attention layer 510 computed according to equation (14)) and encoded dialog history Z 424 as follows:

$$Z_{ds} = \text{Attention}(Z_{ds}, Z, Z) \in \mathbb{R}^{N \times d}. \tag{15}$$

In various embodiments, the multi-layer attention unit 507 enables the models to explicitly obtain dependencies across (domain, slot) pairs in the first attention layer (e.g., domain-slot pair self-attention layer 508), and obtain contextual dependencies in the subsequent attention layers (e.g., partially delexicalized context attention layer 510 and context attention layer 512). By adding the delexicalized dialog history as input, important contextual signals are provided as the models may learn mapping between real-value tokens and generalized domain-slot tokens.

In some embodiments, to further improve the model capability to capture those dependencies, in the multi-layer attention unit 507, the attention sequence (e.g., the sequence of layers 508, 510, and 512) is repeated multiple times with $Z_{ds}$. In those embodiments, at attention step t, the output from the previous attention layer step t−1 is used as input to current layer to compute $Z_{ds}^t$. The output in the last attention layer $Z_{ds}^{T_{fert}}$ is passed to two independent linear transformations 516-1 and 516-2 of the attention mechanism 507, which generates fertility decoder output 518 of the fertility decoder 501. For example, the output 518 may include prediction for fertilities 520 (also referred to as predicted fertilities 520) as follows:

$$P^{fert} = \text{softmax}\left(W_{fert}Z_{ds}^{T_{fert}}\right). \quad (16)$$

For further example, prediction for gates 522 (also referred to as predicted gates 522) of the output 518 may be computed as follows:

$$P^{gate} = \text{softmax}\left(W_{gate}Z_{ds}^{T_{fert}}\right), \quad (17)$$

In various embodiments, $W_{fert}$ and $W_{gate}$ are weights for predicted fertilities and predicted gates respectively. These weights may be initialized (e.g., randomly or with predetermined initialization values), and may be updated during training (e.g., with an optimization function to minimize a loss). $W_{fert}$ and $W_{gate}$ may have different dimensions, e.g., $$W_{gate} \in \mathbb{R}^{d \times 3} \text{ and } W_{fert} \in \mathbb{R}^{d \times 10}.$$

The fertility decoder 501 may be implemented using a neural network, and be trained to improve the predictions of fertilities and gates using a standard cross-entropy loss respectively as follows:

$$\mathcal{L}_{fert} = \sum_{d_g, s_h} -\log\left(P^{fert}\left(Y_f^{d_g, s_h}\right)\right), \text{ and} \quad (18)$$

$$\mathcal{L}_{gate} = \sum_{d_g, s_h} -\log\left(P^{gate}\left(Y_g^{d_g, s_h}\right)\right). \quad (19)$$

In the example of FIG. 5, in the fertility decoder output 518, a predicted fertility 520 and a predicated gate 522 are generated for each (domain, slot) pair. For example, for the domain-slot pair (attraction, area), the predicted fertility is "1," and the predicted gate is "gen." For the (domain, slot) pair (attraction, type), the predicted fertility is "1," and the predicted gate is "gen." For the (domain, slot) pair (taxi, departure), the predicted fertility is "0," and the predicted gate is "none." For the (domain, slot) pair (taxi, destination), the predicted fertility is "0," and the predicted gate is "don't care." For the (domain, slot) pair (restaurant, name), the predicted fertility is "2," and the predicted gate is "gen."

Figure 6:
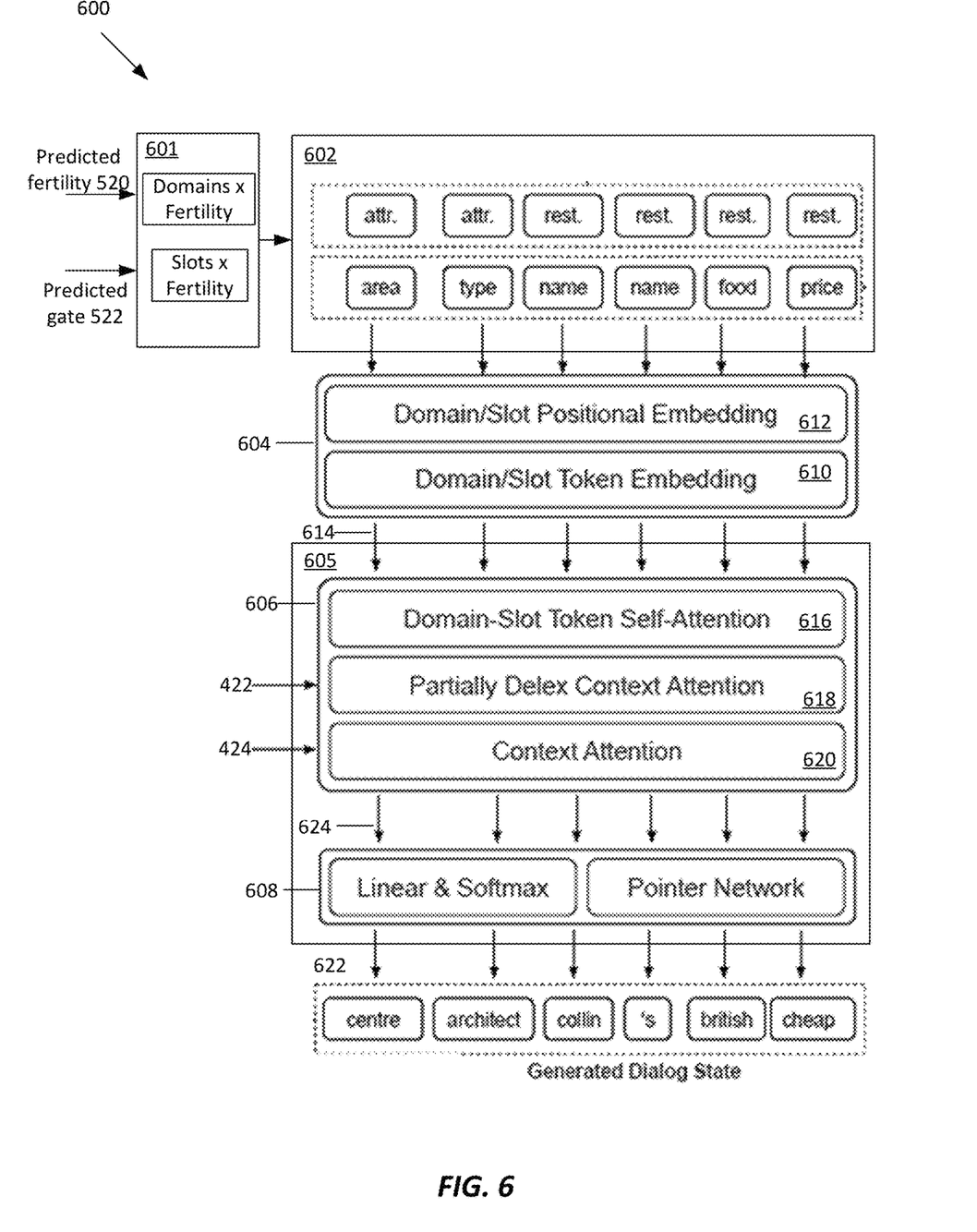
FIG. 6 is a simplified diagram of a state encoder/decoder model of a task-oriented dialog system according to some embodiments.

Referring to FIG. 6, illustrated is an example state encoder/decoder system 600 (e.g., state encoder/decoder 306 of FIG. 3). The state encoder/decoder system 600 includes input sequence generator 601, embedding unit 604 (also referred to as state encoder 604), and a state decoder 605 including attention unit 606 and linear transformation unit 608.

In some embodiments, input sequence generator 601 receives fertility encoder output 518 including predicted fertility 520 and predicted gates 522 (e.g., from fertility decoder 501 of FIG. 5), and generate input sequence $X_{ds \times fert}$ 602. In some embodiments, input sequence generator 601 performs a filtering process to filter out (domain, slot) pairs based the predicted gates 522. For example, (domain, slot) pairs that have gate values including "none" or "don't care" may be filtered out regardless their fertilities. For further example, domain-slot pairs that have gate values including "gen" may remain after the filtering process, and are used to generate the input sequence 602. The sequence 602 may include sub-sequences of $(d_g, s_h)$ repeated by predicted fertility $Y_f^{d_g, s_h}$ and concatenated sequentially as follows:

$$X_{ds \times fert} = \left((d_1, s_1)^{Y_f^{d_1, s_1}}, \ldots, (d_G, s_H)^{Y_f^{d_G, s_H}}\right). \quad (20)$$

where $\|X_{ds \times fert}\| = \|Y\|$.

In the example of FIG. 6, the input sequence 602 includes (domain, slot) pairs including the remaining (domain, slot) pairs after the filtering process, where the frequency (i.e., a total number of) of a particular (domain, slot) pair in the sequence 602 is determined by its corresponding predicted fertility (e.g., "2" for (restaurant, name)). As such, the sequence 602, as generated according to equation (20), includes (attraction, area)×1, (attraction, type)×1, (restaurant, name)×2, (restaurant, food)×1, and (restaurant, price)×1.

In some embodiments, state encoder 604 (e.g., domain/slot encoder 302-3 of FIG. 3) receives the input sequence $X_{ds \times fert}$ 602, and performs encoding to the input sequence $X_{ds \times fert}$ 602 to generate encoded sequence $Z_{ds \times fert}$ 614. State encoder 604 includes domain-slot token embedding unit 610 for performing domain-slot token embedding, and includes domain/slot positional embedding unit 612 for performing domain/slot positional embedding. In various embodiments, domain/slot positional embedding unit 612 is used to inject sequential attributes to enable non-autoregressive decoding. In some embodiments, the encoded sequence $Z_{ds \times fert}$ 614 is provided by the encoder system 400 (e.g., encoded sequence $Z_{ds \times fert}$ 430 from the encoder system 400).

In some embodiments, the attention unit 606 is substantially similar to the attention unit 507 of the fertility decoder 501 except the differences described below. The attention unit 606 includes a sequence of attention layers including domain-slot token self-attention layer 616, partially delexicalized context attention layer 618, and context attention layer 620, which incorporate contextual information into each $Z_{ds \times fert}$ vector. It is noted the attention unit 507 of fertility decoder 501 captures high-level dependencies at the domain/slot pair level (e.g., dependencies between (domain, slot) pairs including "train-departure" and "train-arrival" exhibiting a location-wise relation). On the other hand, in the attention unit 606, the dependencies are captured at the token-level across all (domain, slot) pairs. After repeating the attention sequence for $T_{state}$ times, the output $Z_{ds \times fert}^{T_{state}}$ 624 from the attention unit 606 is sent to a linear transformation unit 608. Domain-slot pair self-attention layer is to capture the high-level dependencies between (domain, slot) pairs e.g. train-departure vs. train-arrival will exhibit location-wise relation. Domain-slot token self-attention layer is to capture the token-level dependencies across all (domain, slot) pairs.

In some embodiments, the linear transformation unit 608 generates predicted slot values 622 (also referred to as generated dialog state 622) based on $Z_{ds \times fert}^{T_{state}}$ 624. The predicted slot values may be computed as follows:

$$P_{vocab}^{state} = \text{softmax}\left(W_{state} Z_{ds \times fert}^{T_{state}}\right). \tag{21}$$

where $W_{gate} \in \mathbb{R}^{d \times |V|}$ with V as the set of output vocabulary. $W_{state}$ may be initialized (e.g., randomly or with a predetermined initialization value), and may be updated during training (e.g., with an optimization function to minimize a loss).

In some embodiments open-vocabulary DST models are used. Because open-vocabulary DST models do not assume a known slot ontology with fixed slot value candidates and generate the candidates from the dialog context itself, OOV is a potential problem during inference process. In some embodiments, throughout the decoding process, the hidden states of dialog context may be stored (e.g., in a memory). Those hidden states may be used by a pointer network to copy words for dialog state generation, which is used to overcome the OOV challenges. For example, a dot-product attention is applied between the state decoder output $Z_{ds \times fert}^{T_{state}}$ 624 and the stored memory of encoded dialog context Z as follows:

$$P_{ptr}^{state} = \text{softmax}\left(Z_{ds \times fert}^{T_{state}} Z^T\right). \tag{22}$$

The final probability of predicted state may be defined as the weighted sum of the two probabilities $P_{vocab}^{state}$ and $P_{ptr}^{state}$ as follows:

$$P^{state} = p_{gen}^{state} \times P_{vocab}^{state} + \left(1 - p_{gen}^{state}\right) \times P_{ptr}^{state}, \tag{23}$$

$p_{gen}^{state}$ is a trainable vector used to compute weights of the two probabilities:

$$p_{gen}^{state} = \text{sigmoid}\left(W_{gen} V_{gen}\right), \tag{24}$$

$$V_{gen} = Z_{ds \times fert} \oplus Z_{ds \times fert}^{T_{state}} \oplus Z_{exp}, \tag{25}$$

where $W_{gen} \in \mathbb{R}^{3d \times 1}$ and $Z_{exp}$ is the expanded vector of Z to match dimensions of $Z_{ds \times fert}$.

The final probability is used to train the state generation following the cross-entropy loss function as follows:

$$\mathcal{L}_{state} = \sum_{d_g, s_h} \sum_{m=0}^{Y_f^{d_g, s_h}} -\log\left(P^{state}\left(y_m^{d_g, s_h}\right)\right). \tag{26}$$

All parameters of the neural network model are optimized by jointly training the encoders, the fertility decoder, and the state decoder by minimizing the weighted sum of three losses:

$$\mathcal{L} = \mathcal{L}_{state} + \alpha \mathcal{L}_{gate} + \beta \mathcal{L}_{fert}, \tag{27}$$

where $\alpha$, and $\beta$ are hyper-parameters.

Figure 7:
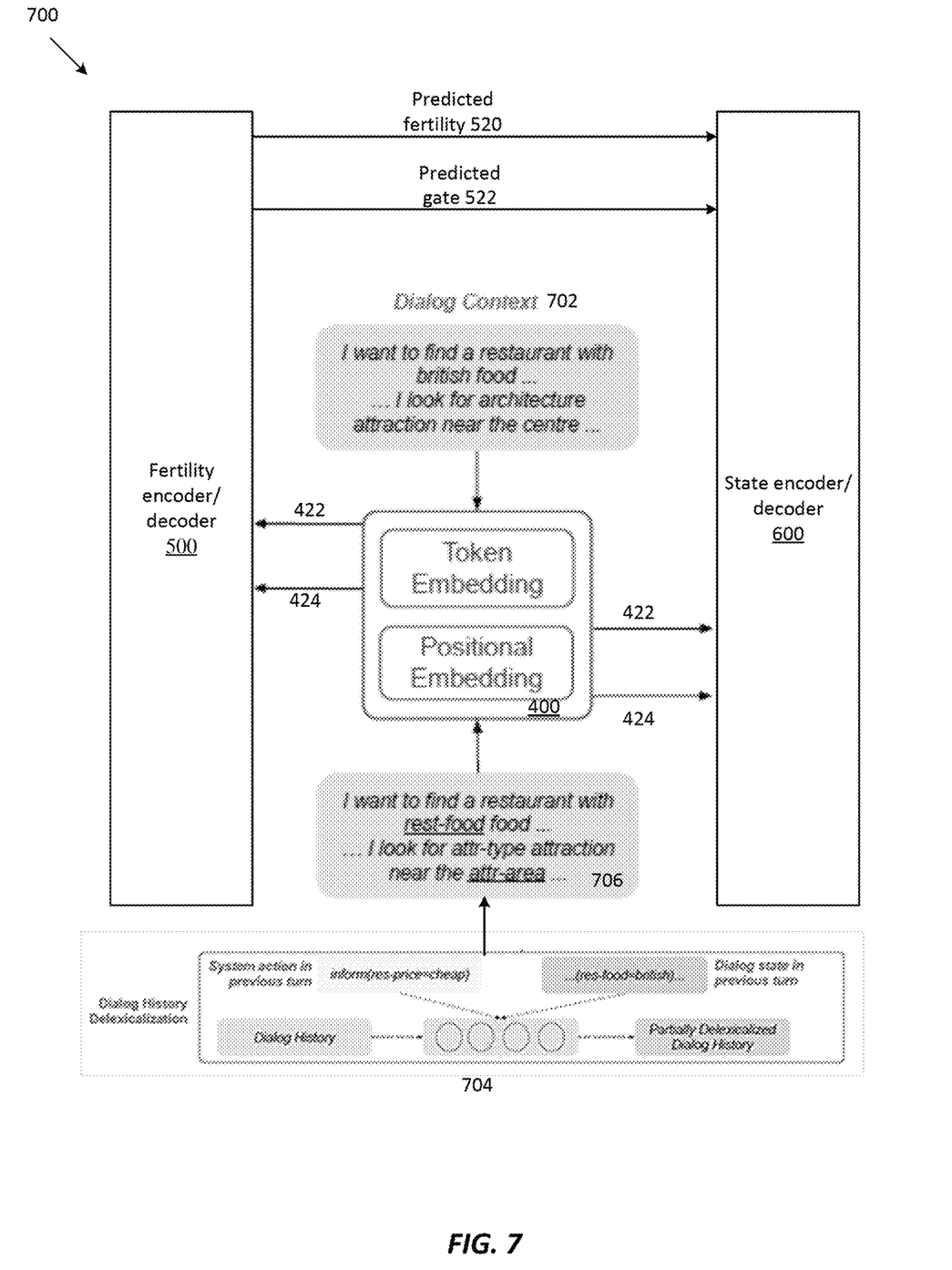
FIG. 7 is a simplified diagram of another task-oriented dialog system according to some embodiments.

Referring to FIG. 7, illustrated is an example dialog state tracking system 700. The dialog state tracking system 700 may include encoder 702, fertility encoder/decoder system 500, and slate encoder/decoder system 600.

The encoder 702 may receive a dialog context 702 for the current turn of the dialog. In an example, the dialog context 702 includes "I want to find a restaurant with British food . . . I look for architecture attraction near the centre." The encoder 400 receives may receive a system action 704 in the previous turn (e.g., "inform (res-price=cheap)" indicating that the restaurant price having a value of "cheap"), and a dialog state 622 in the previous turn (e.g., provided by state encoder/decoder system 600). Partially delexicalized context 706 may be generated based on the dialog context 702, the system action 704 in the previous turn, and the dialog state 622 in the previous turn. In an example, the partially delexicalized context 704 includes "I want to find a restaurant with rest-food food . . . I look for attr-type attraction near the attr-area . . . "

The encoder 702 may provide encoded dialog context 422 and encoded delexicalized dialog context 424 to a fertility encoder/decoder 500 (e.g., fertility encoder/decoder 500 of FIG. 5) and a state encoder/decoder 600 (e.g., state encoder/decoder 600 of FIG. 6).

The dialog state tracking system and method described herein may be used in various multi-domain task-oriented dialogue datasets, e.g., including seven or more domains. In some datasets, each dialogue has more than one domain. The dialogues may be preprocessed using various preprocessing procedures, including e.g., tokenizing, lower-casing, delexicalizing all system responses, etc.

Various training and inference procedures may be used in the dialog state tracking system. In some embodiments, during training, label smoothing is used to train the prediction of dialogue state Y, but is not used to train prediction of fertilities $Y_{fert}$ and gates $Y_{gate}$. In some embodiments, a 100% teacher-forcing training strategy is used by using the ground-truth of $X_{ds \times fert}$ as input to the state encoder/decoder. In some embodiments, the same strategy to obtain delexicalized dialogue history (e.g., by delexicalize dialogue history from the ground-truth belief state in previous dialogue turn rather relying on the predicted belief state).

During inference, in some embodiments, dialogue states are generated turn-by-turn, and the predicted belief states in turn t−1 are used to delexicalize dialogue history in turn t. During inference, in some embodiments, $X_{ds \times fert}$ is also constructed by prediction $\hat{Y}_{gate}$ and $\hat{Y}_{fert}$. Various optimization methods may be used. For example, Adam optimizer and the learning rate strategy may be used. In some examples, best models are selected based on the best average joint accuracy of dialogue state prediction in the validation set. In some examples, parameters are randomly initialized with uniform distribution. In some examples, pretrained word- or character-based embedding weights are not utilized. In some examples, hyper-parameters are turned with grid search over validation sets.

In some embodiments, the performance of the dialog state tracking model is evaluated based on the joint goal accuracy. In some examples, a metric compares the predicted dialogue states to the ground truth in each dialogue turn. The dialog state tracking model provides improved performance (e.g., improved joint accuracy and slot accuracy) by using the various techniques described herein. For example, the dialog state tracking model provides model capability of learning cross-domain and cross-slot signals, and directly optimizes towards the evaluation metric of joint goal accuracy rather than just optimizing towards accuracy of individual slots. For further example, positional encoding of $X_{ds \times fert}$ is performed to inject sequential attributes to enable non-autoregressive decoding. For further example, slot gating is implemented such that the model does not need to learn to predict a fertility for certain slots (e.g., with gate values "none" or "don't care"). For further example, using delexicalized dialog history $X_{del}$ as input improves the performance, e.g., joint fertility accuracy. For further example, by using pointer generation, the model is able to infer slot values unseen during training. As such, by using the non-autoregressive neural architecture, the dialog state tracking model is enabled to explicitly learn dependencies at both slot-level and token-level to improve the joint accuracy rather than just individual slot accuracy. Fast decoding of dialogue states is achieved by adopting parallel decoding strategy in decoding components. Accordingly, improved joint accuracy for DST tasks is archived with low inference latency.

Some examples of computing devices, such as computing device 100 may include non-transitory, tangible, machine readable media that include executable code that when run by one or more processors (e.g., processor 110) may cause the one or more processors to perform the processes of method 200 or implement the systems 300, 400, 500, 600, and 700. Some common forms of machine readable media that may include the processes of method/system 200, 300, 400, 500, 600, and 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for dialog state tracking via a machine learning model, comprising:
    encoding, by an encoder of the machine learning model, dialog information associated with a dialog to provide encoded dialog information;
    decoding, by a fertility decoder of the machine learning model, the encoded dialog information to generate fertilities for generating dialog states of the dialog,
        wherein the generating the fertilities includes determining dependencies across domain-slot pairs;
        wherein each dialog state includes one or more domains,
        wherein each domain includes one or more slots, and
        wherein each slot includes one or more slot tokens,
    generating an input sequence to a state decoder based on the fertilities, wherein a total number of each slot token in the input sequence is based on a corresponding fertility;
    encoding, by a state encoder, the input sequence to the state decoder; and
    decoding, by the state decoder, the encoded input sequence to generate a complete sequence of the dialog states.

2. The method of claim 1, wherein the generated complete sequence of the dialog states is used to automatically generate a response in the dialog.

3. The method of claim 1, wherein the encoded dialog information includes encoded dialog context, encoded delexicalized dialog context, and encoded domain-slot tokens.

4. The method of claim 1, wherein the fertility decoder includes a sequence of attention layers to determine the dependencies across domain-slot pairs at a slot level,
    where the sequence of attention layers includes a domain-slot pair self-attention layer, a partially delexicalized context attention layer, and a context attention layer.

5. The method of claim 1, wherein the encoding the input sequence to the state decoder includes:
    performing domain/slot positional embedding and domain-slot token embedding to the input sequence to generate the encoded input sequence.

6. The method of claim 1, wherein the state decoder includes a sequence of attention layers to determine the dependencies across domain-slot pairs at a slot token level,
    wherein the sequence of attention layers includes a domain-slot token self-attention layer, a partially delexicalized attention layer, and a context attention layer.

7. The method of claim 1, further comprising:
generating, by the fertility decoder, gates corresponding to the fertilities,
wherein the input sequence is generated by performing a filter process based on the gates for corresponding fertilities.

8. A non-transitory machine-readable medium comprising a plurality of machine-readable instructions which, when executed by one or more processors, are adapted to cause the one or more processors to perform a method comprising:
encoding, by an encoder of a machine learning model, dialog information associated with a dialog to provide encoded dialog information;
decoding, by a fertility decoder of the machine learning model, the encoded dialog information, to generate fertilities for generating dialog states,
wherein the generating the fertilities includes determining dependencies across domain-slot pairs;
wherein each dialog state includes one or more domains,
wherein each domain includes one or more slots, and wherein each slot includes one or more slot tokens;
generating an input sequence to a state decoder based on the fertilities from the fertility decoder, wherein a total number of each slot token in the input sequence is based on a corresponding slot fertility;
encoding, by a state encoder, the input sequence to the state decoder; and
decoding, by the state decoder, the encoded input sequence to generate a complete sequence of the dialog states.

9. The non-transitory machine-readable medium of claim 8, wherein the generated complete sequence of the dialog states is used to automatically generate a response in the dialog.

10. The non-transitory machine-readable medium of claim 8, wherein the encoded dialog information includes encoded dialog context, encoded delexicalized dialog context, and encoded domain-slot tokens.

11. The non-transitory machine-readable medium of claim 8, wherein the fertility decoder includes a sequence of attention layers to determine the dependencies across domain-slot pairs at a slot level,
where the sequence of attention layers includes a domain-slot pair self-attention layer, a partially delexicalized context attention layer, and a context attention layer.

12. The non-transitory machine-readable medium of claim 8, wherein the encoding the input sequence to the state decoder includes:
performing domain/slot positional embedding and domain-slot token embedding to the input sequence to generate the encoded input sequence.

13. The non-transitory machine-readable medium of claim 8, wherein the state decoder includes a sequence of attention layers to determine the dependencies across domain-slot pairs at a slot token level,
wherein the sequence of attention layers includes a domain-slot token self-attention layer, a partially delexicalized attention layer, and a context attention layer.

14. The non-transitory machine-readable medium of claim 8, wherein the method further comprises:
generating, by the fertility decoder, gates corresponding to the fertilities,
wherein the input sequence is generated by performing a filter process based on the gates for corresponding fertilities.

15. A system, comprising:
a non-transitory memory; and
one or more hardware processors coupled to the non-transitory memory and configured to read instructions from the non-transitory memory to cause the system to perform a method comprising:
encoding, by an encoder of a machine learning model, dialog information associated with a dialog to provide encoded dialog information;
decoding, by a fertility decoder of the machine learning model, the encoded dialog information, to generate fertilities;
wherein the generating the fertilities includes determining dependencies across domain-slot pairs;
generating an input sequence to a state decoder based on the fertilities from the fertility decoder, wherein the number of times the slot tokens are included in the input sequence is based on the corresponding fertilities;
encoding the input sequence to the state decoder; and
decoding, by the state decoder, the encoded input sequence to generate a complete sequence of dialog states.

16. The system of claim 15, wherein the generated complete sequence of the dialog states is used to automatically generate a response in the dialog.

17. The system of claim 15, wherein the encoded dialog information includes encoded dialog context, encoded delexicalized dialog context, and encoded domain-slot tokens.

18. The system of claim 15, wherein the fertility decoder includes a sequence of attention layers to determine the dependencies across domain-slot pairs at a slot level,
where the sequence of attention layers includes a domain-slot pair self-attention layer, a partially delexicalized context attention layer, and a context attention layer.

19. The system of claim 15, wherein the encoding the input sequence to the state decoder includes:
performing domain/slot positional embedding and domain-slot token embedding to the input sequence to generate the encoded input sequence.

20. The system of claim 15, wherein the state decoder includes a sequence of attention layers to determine the dependencies across domain-slot pairs at a slot token level,
wherein the sequence of attention layers includes a domain-slot token self-attention layer, a partially delexicalized attention layer, and a context attention layer.

* * * * *